Figure 1:
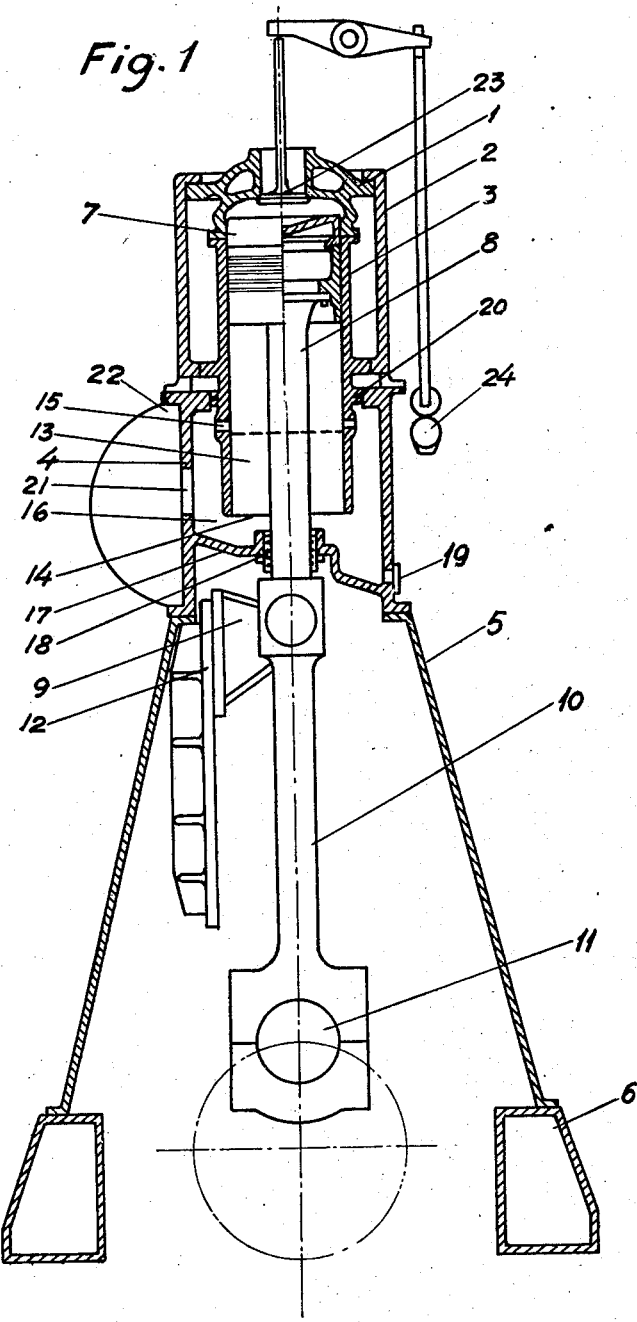

Sept. 2, 1941.   H. C. H. ANDRESEN   2,254,410
MULTICYLINDER, SINGLE-ACTING, TWO-STROKE-CYCLE INTERNAL
COMBUSTION ENGINE OF THE CROSS-HEAD TYPE
Filed Oct. 9, 1939   2 Sheets-Sheet 2

Inventor,
H.C.H. Andresen
By: Glascock Downing & Seebold
Attys.

Patented Sept. 2, 1941

2,254,410

UNITED STATES PATENT OFFICE 2,254,410

MULTICYLINDER, SINGLE-ACTING, TWO-STROKE-CYCLE INTERNAL COMBUSTION ENGINE OF THE CROSS-HEAD TYPE

Haakon Carl Herman Andresen, Hellerup, near Copenhagen, Denmark

Application October 9, 1939, Serial No. 298,682
In Denmark October 29, 1938

3 Claims. (Cl. 123—173)

This invention relates to multi-cylinder, single-acting, two-stroke-cycle internal combustion engines of the cross-head type, the construction of which permits the piston to uncover during its upstroke the scavenging air ports placed at the lower portion of the cylinder. This is made possible in known manner thereby that the open cylinder end opens into the scavenging air chest proper, so that the piston can be made very short, because it need not—as is the case in other single-acting two-stroke engines—be so long as to cover the scavenging air ports during the whole of the part of the stroke during which no scavenging air shall be admitted. The advantages of the short piston are, amongst other things, a reduced piston weight and a smaller height of the engine as a whole.

The invention consists primarily in a particular design of engines of the said kind due to which it becomes possible to combine the application of a cylinder, opening freely into the scavenging air chamber (meaning a short piston), with the employment of a freely depending cylinder liner which is only secured to stationary engine parts with its upper end.

The object of the invention is to construct an engine of the kind referred to above in which the advantages of being able to use a short piston are attained without having to give up other advantages as regards a simple lay-out, a reliable and easily demountable construction, relieving the cylinder liner of heat tensions and vertical combustion forces and obtaining ample port area for the admittance of scavenging air.

In order to prevent the oil, oozing down from the cylinder liner into the scavenging air chest, from accumulating in too large quantities in the scavenging air chest, the bottom of the chest is conveniently made to decline towards a draining member, through which the oil can be removed. The piston rod shall, as it will be understood, be carried through a stuffing box in the bottom of the scavenging air chest down into the crank case, and in order to prevent the scavenging air, which has a pressure somewhat above that of the atmosphere, from penetrating down into the crank case, or oil vapours from the latter from penetrating into the scavenging air chest, there is conveniently fitted a separate cover over the crank case, so that between the latter and the bottom of the scavenging air chest there is formed a compartment which communicates with the open air.

With these and other objects in view the invention consists in the new combinations and arrangements of parts described in the following and specified in the appended claims.

Figure 2:
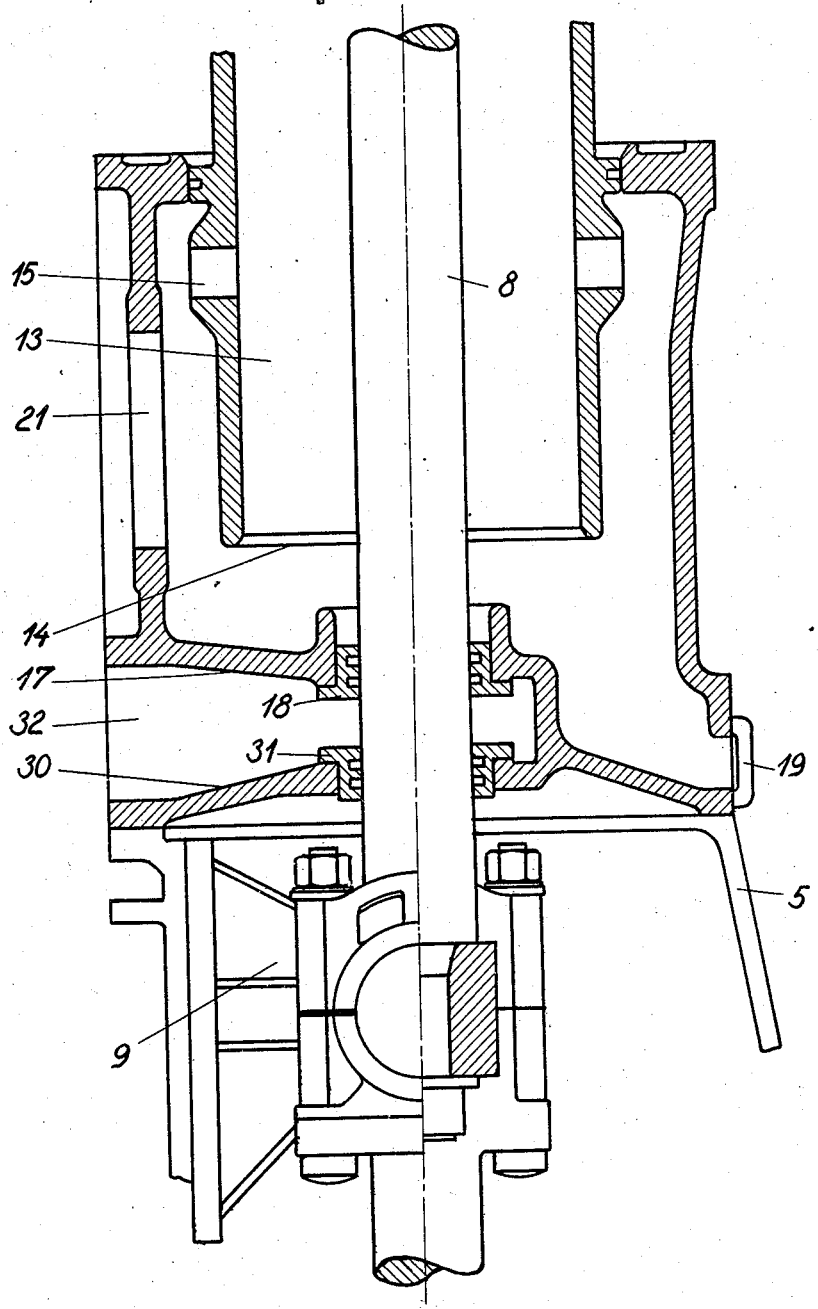

The invention is illustrated on the accompanying drawings on which:

Fig. 1 is a vertical section, partly diagrammatical, through an embodiment of an engine according to the invention, and Fig. 2 is a vertical section drawn to a larger scale through the air chest and adjoining parts of a modified embodiment.

The two-stroke, single-acting crosshead engine shown on the drawings comprises a cylinder cover 1 suspended by bolts (not shown) passed through an upper flange thereon from a cylinder frame 2 and carrying a cylinder liner 3 by means of a lower flange. The cylinder frame 2 is resting on a scavenging air belt 4, which is in turn supported on the top of an engine frame 5 resting on the bed-plate 6 of the engine.

The working piston 7 is through a piston rod 8, a crosshead 9 and a connecting rod 10 connected to the crank 11. The guide for the crosshead is marked 12.

As illustrated on the drawings, the scavenging air belt 4 constitutes an air-tight chest, the interior 16 of which communicates with the usual scavenging air receiver 22 through an opening 21. When the piston 7 is at the bottom of its power stroke, scavenging air ports in the lower end of the cylinder liner 3 are uncovered so that scavenging and charging air will pass from the receiver 22 through the chest 16 and the ports 15 into the cylinder above the upper surface of the piston. In the constructional form shown, the bottom 17 of the said chest closes the crank case upwardly and contains a stuffing box 18, through which the piston rod 8 is passing, being rendered air-tight and oil-tight by means of sealing rings and scraper rings. The bottom 17 of the chest declines to one side towards a drain opening 19, through which the oil dripping from the cylinders can be removed.

The lower end of the cylinder liner 3, in which the usual scavenging air ports 15 are placed, is carried down through an opening in the upper side of the chest-like scavenging air belt and is made air-tight against the latter by means of a sealing ring 20 so as to allow the cylinder liner and the scavenging air belt to move axially to a certain degree in relation to one another. The lower open end 14 of the cylinder liner opens freely into the scavenging air chest.

The exhaust of the combustion gases is effected through an exhaust valve 23 placed in the cover 1, the said valve being actuated in the usual manner by a cam shaft 24.

Fig. 2 shows a modified construction of the scavenging air chest for ensuring against penetration of the scavenging air through the piston rod stuffing box down into the crank case and for preventing oil vapors from the crank case from penetrating into the scavenging air chest. In this embodiment the bottom 17 of the scavenging air chest does not form alone the cover for the crank case but a separate cover plate 30 is provided. Thus a space 32 is provided between the bottom of the scavenging air chest and the said separate cover plate, this space being in open communication with the exterior atmosphere at one side. In this manner the piston rod stuffing box may be divided as shown into two parts, namely, one part 18 sealing the scavenging air chest and another part 31 independently sealing the crank case.

The invention is not limited to the constructional form shown and described, the details of which may be varied in several ways within the scope of the invention.

I claim:

1. A multi-cylinder single-acting two-stroke cycle internal combustion engine of the crosshead type in which each cylinder unit comprises exhaust means disposed above the upper dead center position of the working piston, scavenging and charging ports disposed only in the vicinity of the lower dead center position of the working piston and controlled by the latter, a working piston of such comparatively restricted axial length as to uncover the scavenging and charging ports during a considerable portion of its travel in the upper part of the cylinder, and a freely depending cylinder liner being only secured to stationary engine parts with its upper end, the scavenging and charging ports being arranged in the lower end of the liner, and having a closed scavenging air chest common to a number of cylinder units and communicating freely with a scavenging air receiver, apertures being provided in the upper wall of said scavenging air chest through which the lower ends of the liners are projecting air-tight but axially movable in a such a manner that the scavenging air ports lie freely within the scavenging air chest, and a stuffing box for receiving the piston rod provided in the bottom wall of said scavenging air chest.

2. A multi-cylinder single-acting two-stroke cycle internal combustion engine of the crosshead type in which each cylinder unit comprises exhaust means disposed above the upper dead center position of the working piston, scavenging and charging ports disposed only in the vicinity of the lower dead center position of the working piston and controlled by the latter, a working piston of such comparatively restricted axial length as to uncover the scavenging and charging ports during a considerable portion of its travel in the upper part of the cylinder, and a freely depending cylinder liner being only secured to stationary engine parts with its upper end, the scavenging and charging ports being arranged in the lower end of the liner, and having a closed scavenging air chest common to a number of cylinder units and communicating freely with a scavenging air receiver, apertures being provided in the upper wall of said scavenging air chest through which the lower ends of the liners project air-tight but axially movable in such a manner that the scavenging air ports lie freely within the scavenging air chest, the bottom wall of the said scavenging air chest being obliquely arranged with a drainage course towards discharge means for waste lubricating oil and having a stuffing box for receiving the piston rod.

3. A multi-cylinder single-acting two-stroke cycle internal combustion engine as claimed in claim 1, in which a separate cover is provided above the crank case below the bottom wall of the scavenging air chest and having a separate stuffing box for receiving the piston rod, the space between the said cover and the said bottom wall communicating freely with the atmosphere.

HAAKON CARL HERMAN ANDRESEN.